(12) United States Patent
Virsila

(10) Patent No.: US 9,540,126 B2
(45) Date of Patent: Jan. 10, 2017

(54) APPARATUS AND METHOD FOR FORMING OF COLLATIONS OF ROD SHAPED ARTICLES

(71) Applicant: PHILIP MORRIS PRODUCTS S.A., Neuchatel (CH)

(72) Inventor: Arvydas Virsila, Klaipeda (LT)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 14/416,100

(22) PCT Filed: Jul. 2, 2013

(86) PCT No.: PCT/EP2013/001936
§ 371 (c)(1),
(2) Date: Jan. 21, 2015

(87) PCT Pub. No.: WO2014/015940
PCT Pub. Date: Jan. 30, 2014

(65) Prior Publication Data
US 2015/0197356 A1    Jul. 16, 2015

(30) Foreign Application Priority Data

Jul. 27, 2012 (EP) .................................. 12005510

(51) Int. Cl.
*B65G 37/00* (2006.01)
*B65B 19/04* (2006.01)
(Continued)

(52) U.S. Cl.
CPC ............... *B65B 19/04* (2013.01); *A24F 15/00* (2013.01); *B65B 19/10* (2013.01); *B65B 19/12* (2013.01);
(Continued)

(58) Field of Classification Search
CPC ....... B65G 19/04; B65G 19/10; B65G 19/105; B65G 37/00; B65B 19/04; B65B 19/10; B65B 19/105; B65B 19/18
(Continued)

(56) References Cited

U.S. PATENT DOCUMENTS 4,362,235 A * 12/1982 Erdmann ............... B65G 57/32
                                                   198/418.3
4,700,825 A * 10/1987 Mattei ..................... B65B 19/10
                                                   198/418.3
(Continued)

FOREIGN PATENT DOCUMENTS

CN        2554095        6/2003
CN        1164981        9/2004
(Continued)

OTHER PUBLICATIONS

PCT Search Report for PCT/EP2013/001936 dated Jul. 23, 2013 (2 pages).
(Continued)

*Primary Examiner* — James R Bidwell
(74) *Attorney, Agent, or Firm* — Mueting, Raasch & Gebhardt, P.A.

(57) ABSTRACT

An apparatus for forming a predetermined collation of rod shaped articles, in particular smoking articles, includes a feeder arrangement, and a pocket. The pocket is adapted to house a predetermined number of rod shaped articles in the predetermined collation in a predetermined position within the pocket. The apparatus further includes a hopper with a plurality of hopper vanes, wherein each hopper vane is at least associated to one predetermined position in the pocket. The feeder arrangement includes a first feeder being adapted to provide a first subgroup of rod shaped articles of a first type to a first subset of hopper vanes, a second feeder being adapted to provide a second subgroup of rod shaped articles
(Continued)

of a second type to a second subset of hopper vanes, and a third feeder being adapted to provide a third subgroup of rod shaped articles of a third type to a third subset of hopper vanes.

19 Claims, 2 Drawing Sheets

(51) Int. Cl.
    *B65B 19/10*     (2006.01)
    *B65B 19/12*     (2006.01)
    *A24F 15/00*     (2006.01)
    *B65B 19/18*     (2006.01)
    *B65D 25/04*     (2006.01)
    *B65D 85/08*     (2006.01)

(52) U.S. Cl.
    CPC ............... *B65B 19/18* (2013.01); *B65D 25/04* (2013.01); *B65D 85/08* (2013.01); *B65G 37/00* (2013.01)

(58) Field of Classification Search
    USPC ........ 198/347.1, 347.4, 418.1, 418.2; 53/149
    See application file for complete search history.

(56) References Cited

U.S. PATENT DOCUMENTS

| | | | |
|---|---|---|---|
| 5,775,054 A | 7/1998 | Boldrini | |
| 6,318,540 B1 * | 11/2001 | Spatafora | B65B 19/04 198/347.1 |
| 6,484,867 B2 * | 11/2002 | Spatafora | B65B 19/10 131/282 |
| 7,171,796 B2 * | 2/2007 | Spirito | B65B 19/10 53/151 |
| 7,571,798 B2 * | 8/2009 | Spatafora | A24C 5/35 198/347.1 |
| 7,827,767 B2 * | 11/2010 | Bertuzzi | B65B 19/10 53/148 |
| 8,322,511 B2 * | 12/2012 | Leifheit | B65B 19/10 193/30 |

FOREIGN PATENT DOCUMENTS

| | | |
|---|---|---|
| CN | 101337590 | 1/2009 |
| EP | 0 141 629 | 5/1985 |
| EP | 2 008 935 | 12/2008 |
| GB | 2 188 895 | 10/1987 |
| JP | 2003 205909 | 7/2003 |
| KR | 20050059857 | 6/2005 |

OTHER PUBLICATIONS

European Search Report for Application No. 12005510.8-2308 dated Feb. 5, 2013 (6 pages).

Office Action issued in China for Application No. 201380044935.3 daed Dec. 29, 2015 (18 pages). English translation included.

* cited by examiner

APPARATUS AND METHOD FOR FORMING OF COLLATIONS OF ROD SHAPED ARTICLES

This application is a U.S. National Stage Application of International Application No. PCT/EP2013/001936, filed Jul. 2, 2013, which was published in English on Jan. 30, 2014, as International Patent Publication WO 2014/015940 A1. International Application No. PCT/EP2013/001936 claims priority to European Application No. 12005510.8, filed Jul. 27, 2012.

The invention relates to an apparatus for the forming of collations of rod shaped articles, in particular smoking articles. The invention further relates to a method of forming a collation of rod shaped articles and to a container comprising rod shaped articles, which have been formed into a collation by the inventive method.

Units for forming groups of rod shaped articles are known. For example, U.S. Pat. No. 5,775,054 discloses an apparatus wherein three layers of cigarettes are fed subsequently from a hopper into pockets on a conveyor belt. EP 2 008 935 A1 discloses a packing machine for cigarettes, wherein only one type of smoking article can be packaged in one container.

It is known in the art that different types of rod shaped articles can be arranged in a predetermined arrangement of rod shaped articles, the so called "collation" of rod shaped articles. However, the arrangement of rod shaped articles is restricted to the provision of a whole different layer or column of rod shaped articles in the respective pockets, and the arrangement is in particular limited in that different smoking articles cannot be provided in the center of the collation of the smoking articles. EP 0 141 629 A1 discloses a packing machine, which enables to separately wrap two smoking article groups, which can then be packed together in one container. JP 2003-205909 A discloses a cigarette package encasing different kinds of cigarettes, wherein each of the columns in the package comprises only one kind of smoking articles, respectively.

It is an object of the invention to provide an apparatus and a method for the forming of collations of rod shaped articles, which provides an improved flexibility in building a collation of rod shaped articles comprising different types of rod shaped articles. A further object of the invention is to provide a machine produced container for housing rod shaped articles in a collation, wherein rod shaped articles of a first type are nested within rod shaped articles from a second, different type.

According to the invention, an apparatus for forming a predetermined collation of rod shaped articles, in particular smoking articles, is provided, comprising a feeder arrangement, a pocket, the pocket being adapted to house a predetermined number of rod shaped articles in the predetermined collation, wherein in the predetermined collation each rod shaped article has a predetermined position within the pocket. The apparatus further comprises a hopper with a plurality of hopper vanes, wherein each hopper vane is associated to one or a plurality of predetermined positions in the pocket. The feeder arrangement comprises a first feeder being adapted to provide a first subgroup of rod shaped articles of a first type to a first subset of hopper vanes, the first subgroup of the rod shaped articles being a first part of the predetermined collation, a second feeder being adapted to provide a second subgroup of rod shaped articles of a second type to a second subset of hopper vanes, the second subgroup of the rod shaped articles being a second part of the predetermined collation, and a third feeder being adapted to provide a third subgroup of rod shaped articles of a third type to a third subset of hopper vanes, the third subgroup of the rod shaped articles being a third part of the predetermined collation. According to the invention, the second feeder is arranged in between the first feeder and the third feeder, and at least the first type and the third type of rod shaped articles is different from the second type of rod shaped articles.

It will be appreciated that through an appropriate choice of the dimensions of the pocket, the pocket may house different total numbers of rod shaped articles or different arrangements of rod shaped articles, referenced hereafter with the term "collation". For example, the pocket may house a total of between ten and thirty rod shaped articles. The rod shaped articles may be arranged in different collations, depending on the total number of rod shaped articles. For example, the rod shaped articles may be arranged in, a single layer of six, seven, eight, nine or ten. Alternatively, the rod shaped articles may be arranged in two or more layers. The two or more layers may contain the same number of rod shaped articles. For example, the rod shaped articles may be arranged in two layers of five, six, seven, eight, nine or ten, three layers of five or seven, or four layers of four, five or six. Alternatively, the two or more layers may include at least two layers containing different numbers of rod shaped articles to each other. For example, the rod shaped articles may be arranged in a layer of five and a layer of six (5-6); a layer of six and a layer of seven (6-7); a layer of seven and a layer of eight (7-8); a middle layer of five and two outer layers of six (6-5-6); a middle layer of five and two outer layers of seven (7-5-7); a middle layer of six and two outer layers of five (5-6-5); a middle layer of six and two outer layers of seven (7-6-7); a middle layer of seven and two outer layers of six (6-7-6); a middle layer of nine and two outer layers of eight (8-9-8); or a middle layer of six with one outer layer of five and one outer layer of seven (5-6-7).

The rod shaped articles may be smoking articles. However, other rod-shaped articles with similar size and dimensions are for example smoking accessories, such as flavor-reservoirs or elongate ash-trays that are arranged in substitution of one or several smoking articles in the collation. In particular, a smoking accessory may be arranged such that it occupies the space which would be usually allocated to one or several smoking articles in the collation.

In one embodiment of the invention, each hopper vane may be associated to one predetermined position in the pocket. Thus, any collation can be formed, as the type of each rod shaped article in the pocket can be determined individually.

In some embodiments according to the invention, the apparatus allows providing three or more different types of rod shaped articles for a collation. However, in a preferred embodiment, the first type of rod shaped articles may be the same as the third type of rod shaped articles. In this case the first and third subset of vanes are preferably arranged in a distance to each other, in particular not adjacent to each other. This allows providing the second type of rod shaped articles in a position in the pocket which is between rod shaped articles of the first and third type. This allows to fill a collation with a first type of rod shaped articles, add a number of different rod shaped articles and then fill up the collation with the first type of rod shaped articles. This can have the effect that, by an adequate choice of the positions of the second type of rod shaped articles, to appear as if the second type of rod shaped articles are placed into the center of the collation. For example, it is thus possible in a collation of three layers, with a middle layer of six and two outer layers of seven (7-6-7), to fill the central two rod shaped articles with a second type of rod shaped articles, such that the collation becomes 7-(2-2-2)-7. Prior to the present invention, such a collation could only be manufactured by hand, but not on high speed machinery.

In some embodiments, a fourth feeder is provided, wherein the fourth feeder is adapted to provide a fourth subgroup of rod shaped articles of a fourth type to a further subset of hopper vanes. Also in this case, some types of the rod shaped articles may be equal, for example the first and the fourth type are equal, or the first and the third type are equal and the second and the fourth type are equal. This allows for additional flexibility in building different collations with different types of rod shaped articles.

In particular, the hopper vanes are hopper channels for guiding the rod shaped articles, which are preferably arranged in a single column and parallel to each other in the respective hopper vane. The hopper vanes of the first subset are different from the vanes of the second subset, and each subset comprises at least one hopper vane. Thus, by means of the inventive apparatus different types of rod shaped articles can be provided in different layers of the pocket. The different types of rod shaped articles may relate to rod shaped smoking articles of different length, diameter, filter construction, brands and combinations thereof.

In particular, the predetermined collation comprises a predetermined number of collation layers and collation columns. The collation comprises at least three different parts, which are formed by the first, second and third subgroups of rod-shaped articles, respectively. Usually, the pocket has a substantially rectangular form with the different layers extending along the longer side of the rectangle, while the columns of rod shaped articles extend substantially along the shorter side of the rectangle. Usually, the longer side of the pocket extends substantially horizontal, while the shorter side of the pocket extends substantially vertical. When forming groups for standard cigarette containers, usually the layers comprise 5 to 7 rod shaped articles in the form of cigarettes, while the columns comprise 3 rod shaped articles. Thus, the pockets allow in particular the provision of rod shaped articles to containers comprising 17 to 21 rod shaped articles.

In particular, it is possible that individual rod shaped articles are omitted from the respective columns or layers in the pocket, to determine the number of rod shaped articles which is formed as a collation in the pocket. Protrusions or place holders may be provided for this purpose. Furthermore, in particular the columns of rod shaped articles may not always be straight, but the rod shaped articles in each of the layers may be shifted in the extension direction of the layer with respect to the adjacent layer, which allows a tighter packing of the rod shaped articles. The rod shaped articles in one layer may be laterally offset to the position of the rod shaped article in an adjacent layer by the radius of a rod shaped article. Thus, the individual smoking articles forming a column are slightly offset with respect to each other in the lateral direction.

It is also possible to construct collations for non-rectangular pockets, like for example parallelepiped, trapezoid or triangular pockets.

In particular, the rod shaped articles are longitudinally extending smoking articles. The longitudinal extension of the smoking article is the main extension direction of the smoking article. In particular, the smoking article is cylindrical, with the longitudinal axis being its central axis. Where the rod shaped articles have a substantially cylindrical form, the nappe is preferably parallel to the longitudinal extension direction. In particular, the rod shaped articles are cigarettes, filter cigarettes, cigars, or components for smoking devices. Components for smoking devices may be longitudinally extending smoking material rods, which are inserted into a heating device, such as an electrical or carbonaceous heating device, and which are heated but not burned during consumption.

In the course of each transfer of rod shaped articles from the hopper vane to the pocket, each hopper vane provides preferably between one and three rod shaped articles to the pocket.

According to the invention, separate transfer locations of hopper vanes provide the different layers of rod shaped articles in the collation. The transfer locations are preferably provided in different positions in the downstream direction of the movement of the pocket relative to the hopper vanes. The second layer is in particular on top of the first layer. The rod shaped articles provided in a transfer location of hopper vanes are in particular transferred at the same time to the pockets such that the different transfer locations of the hopper vanes provide the different layers of rod shaped articles in the pocket. According to a preferred embodiment the subsets of hopper vanes and the transfer locations of hopper vanes are different, such that different types of rod shaped articles are comprised in a layer of rod shaped articles in the pocket. Each layer in the pocket is preferably comprised of several parallel rod shaped articles, which are in particular extending with their longitudinal extension direction in the horizontal direction. A third transfer location of hopper vanes may be provided, which is adapted to provide a third layer of rod shaped articles in the pocket on top of the second layer. Depending on the desired collation of rod shaped articles further layers of rod shaped articles may be provided in the pocket. In particular, the first layer is the lowest layer and initially provided, while the second layer is on top of the first layer and subsequently provided, and the third and further layers may be accordingly provided in some embodiments.

The third subset of hopper vanes is adapted to provide a third type of rod shaped articles in the pocket. Thus, a collation of three different types of rod shaped articles can be arranged in a pocket, allowing filling containers with three different types of rod shaped articles, each type of smoking article being arranged in predefined locations in the container. The third subset of hopper vanes does not necessarily correspond to any layer in the pocket. In contrast, the third subset of hopper vanes may provide rod shaped articles to different groups. The third subset of hopper vanes comprises at least one hopper vane.

In some embodiments, each hopper vane is associated to one collation column or one collation layer. The hopper vane may provide several rod shaped articles, which form a collation column or collation layer. Alternatively, the hopper vane may provide only one rod shaped article, which is part of a collation column or collation layer, while other hopper vanes provide the remaining rod shaped articles of the collation column or collation layer.

Preferably, the number of hopper vanes in the hopper corresponds to the number of rod shaped articles in the predetermined collation such that each hopper vane is associated to a predetermined position for a rod shaped article in the predetermined collation. This allows the highest variety regarding the collation formed by the apparatus.

Preferably, the hopper vanes are arranged in a predetermined number of transfer locations, each transfer location corresponding to a complete layer of predetermined positions in the pocket. The transfer locations are in particular defined by the arrangement of the hopper vanes at their downstream end.

Preferably, a transfer location of hopper vanes corresponds to and provides a layer of rod shaped articles in the pocket. One of the transfer locations preferably comprises hopper vanes of the first subset and at least one hopper vane of the second subset of the hopper vanes. Thus, different types of rod shaped articles are comprised in one transfer location of hopper vanes, and accordingly in one layer in the pocket.

In one embodiment, the pocket and the hopper vanes are adapted to be moved relatively to each other after the provision of a layer of rod shaped articles into the pocket. This allows subsequently providing several layers of rod shaped articles in the pocket, from transfer locations of hopper vanes being arranged at different, subsequential positions. The respective transfer locations of hopper vanes are in particular provided at different heights for transferring the respective rod shaped articles to the pocket. In particular, the first transfer location of hopper vanes is provided at a lower height than the second transfer location of hopper vanes, and in particular the second transfer location of hopper vanes is provided at a lower height than the third transfer location of hopper vanes and so forth.

Preferably, the pocket is movable between the predetermined number of transfer locations. In particular, the pocket is adapted to be moved with respect to the hopper vanes. However, in other embodiments, the hopper vanes may be adapted to be moved with respect to the pocket.

Preferably, a plurality of pockets are provided on a conveyor and are adapted to stop consecutively at each of the transfer locations of hopper vanes, for receiving a layer of rod shaped articles from each of the transfer locations of hopper vanes. The conveyor may in particular be a belt or chain. The respective layers after the first layer may be provided consecutively on top of each other.

In one embodiment, the pockets are provided on an endless conveyor and are adapted to stop consecutively at each of the predetermined number of transfer locations, the apparatus being adapted to transfer one layer of rod shaped articles from each transfer location into each pocket.

Preferably, a vibration means is provided to enable a smooth transport of the rod shaped articles. The vibration means can be arranged either on the feeding arrangement, the hopper or the pockets. The vibration provided by the vibration means prevents that the rod shaped articles are blocked due to static friction. Thus, a smooth transport of the rod shaped articles is possible.

In one embodiment, the feeder arrangement comprises at least two different feeders each providing a different type of rod shaped articles, respectively, wherein the downstream end of the first feeder is arranged at the upstream end of the first subset of the hopper vanes, and the downstream end of the second feeder is arranged at the upstream end of the second subset of hopper vanes. Generally, the feeder arrangement, the hopper, and the pockets are arranged subsequently in this order in the downstream direction. The term "downstream" is referred to a position in a direction of travel of the pocket from one transfer location to the subsequent transfer location. Accordingly, the term "upstream" is referred to a position substantially opposite of the "downstream" position.

In particular, the hopper vanes extend substantially in the vertical direction, wherein each group of hopper vanes has outlets at their lower ends, which are arranged adjacent to each other at the same height. The hopper vanes may be slightly inclined with respect to each other, such that the distance in between the hopper vanes of each transfer location of hopper vanes is reduced toward their downstream end, such that the rod shaped articles which are transferred together from a transfer location to form a layer in the pocket are relatively close to each other. However, at the upstream end of the hopper vanes, all hopper vanes of each subset, or of all transfer locations are preferably substantially equidistant. This facilitates the feeding of the rod shaped articles from the feeder arrangement to the hopper vanes.

Preferably, the lower end of the hopper vanes of a transfer location is at the same level as the layer of rod shaped articles provided by this transfer location of hopper vanes into the pocket, wherein a pushing means is adapted to push the rod shaped articles into the pockets. The pushing movement is preferably substantially in the longitudinal direction of the rod shaped articles.

Preferably each hopper vane corresponds to a chute having a width slightly larger than the diameter of the respective type of rod shaped articles. Thus, in each hopper vane only one rod shaped article may be arranged at the same height, while several rod shaped articles are provided parallel and adjacent to each other in the extension direction of the hopper vane. Preferably, the depth of the hopper vane is slightly larger than the length of the rod shaped articles in the longitudinal direction. Thus, the rod shaped articles are provided in defined positions in the hopper vanes.

The maximum amount of hopper vanes preferably corresponds to the maximum amount of rod shaped articles provided in one pocket, as each hopper vane is preferably assigned to a specific position in the pocket.

The rod shaped articles may be, transferred in one or several steps to the pocket.

According to the invention further a method for forming a collation of rod shaped articles, in particular smoking articles, in a pocket is provided, wherein in the predetermined collation each rod shaped article has a predetermined position in the pocket, comprising the following steps. A plurality of hopper vanes is provided, wherein each hopper vane is at least associated to one predetermined position in the pocket. A first subgroup of rod shaped articles of a first type is provided to a first subset of hopper vanes, a second subgroup of rod shaped articles of a second type is provided to a second subset of hopper vanes and a third subgroup of rod shaped articles of a third type is provided to a third subset of hopper vanes. The rod shaped articles are transferred from the first subset of hopper vanes, the second subset of hopper vanes and the third subset of hopper vanes into the pocket, such that each position in the predetermined collation is occupied by a rod shaped article of a predetermined type. According to the invention, the second subset of hopper vanes is arranged in between the first subset of hopper vanes and the third subset of hopper vanes, and at least the first type of rod shaped articles is different from the second type of rod shaped articles and at least the second type of rod shaped articles is different from the third type of rod shaped articles.

The invention further relates to a method for forming collations of longitudinally extending rod shaped articles, wherein initially at least two different types of rod shaped articles are fed through a hopper, wherein a first type of rod shaped articles is fed through a first subset of hopper vanes, and a second type of rod shaped articles is fed through a second subset of hopper vanes. At least a first and a second layer of rod shaped articles are subsequently transferred from the hopper vanes to a pocket, such that at least one layer in the pocket comprises the first type of rod shaped articles and the second type of rod shaped articles. Preferably, each hopper vane is at least associated to one predetermined position in the pocket.

A subset of rod shaped articles may comprise only one smoking article. In particular, each layer is provided by a different transfer location of hopper vanes. At least one transfer location of hopper vanes is not corresponding to a subset of hopper vanes.

In particular, the step of transferring the rod shaped articles comprises moving the pocket between transfer locations, wherein each transfer location is associated with a layer or column of rod shaped articles in the predetermined collation. Preferably, the method further comprises the step of conveying the pocket with respect to the hopper vanes, wherein the rod shaped articles from the hopper vanes are received in the pocket for each of the layers of rod shaped articles at different conveying positions of the pocket.

Preferably, the step of transferring the rod shaped articles comprises transferring rod shaped article of a first type into the pocket from the first and third subset of hopper vanes and transferring rod shaped article of a second type into the pocket from the second subset of hopper vanes, such that the rod shaped articles of a second type are arranged within at least one layer of the predetermined collation, such that rod shaped articles of the first type are arranged on both sides of the rod shaped articles from a second type within the layer. In this context being arranged on both sides in particular refers to a collation, wherein at least one rod shaped article of the second type is arranged in a column in the pocket, wherein rod shaped articles of the first type are arranged in the same layer but in other columns on both sides of the at least one rod shaped article of a second type.

In one embodiment, the method further comprises the step of providing the rod shaped articles comprised in the pocket to a container while maintaining their relative positions with respect to each other. Thus, the rod shaped articles are transferred from the pocket to a container. The rod shaped articles may be wrapped in an inner liner before being transferred to the container or may be transferred into an inner liner forming an inner container.

Preferably, the method comprises a step of conveying the rod shaped articles in the vertical direction in the hopper vanes with their longitudinal axes being arranged substantially in the horizontal direction, and further conveying the rod shaped articles in their longitudinal direction from the hopper vanes to the pockets. Due to the conveying in the vertical direction in the hopper vanes, the rod shaped articles are conveyed by means of gravity or at least their conveying is supported by gravity.

The invention further provides a container comprising rod shaped articles, which have been formed to a collation by the method or apparatus according to the invention, such that he container comprises at least two different types of rod shaped articles. The container comprises columns and rows with different types of rod shaped articles.

Each layer in the pocket preferably corresponds to one row of rod shaped articles in the container, wherein the row extends in the width direction of the container. In particular, three rows of rod shaped articles are provided in a container, each comprising preferably six or seven rod shaped articles. According to the teaching of the invention, individual rod shaped articles or groups of rod shaped articles of a different type may be provided in predefined locations in the individual rows. In particular, only one smoking article of a different type may be provided in the container, the container being otherwise filled with another type of rod shaped articles.

The present invention is also directed to the use of a feeding apparatus with three hoppers to fill a first type of rod-shaped articles and a second type of rod-shaped articles into a container, wherein, within the collation, the second type of articles are nested within the first type of rod shaped articles. A rod shaped article can be considered as "nested" in a collation, if rod shaped articles of one or several types are arranged on both sides of the at least one nested rod shaped article from another type within a layer in the collation. Further "nested" may refer to a configuration, wherein in a collation at least one nested rod shaped article is encompassed on both sides in the layer and column direction by rod shaped articles of another type.

The invention will now be further described with reference to exemplary embodiments as shown in the figures.

Figure 1:
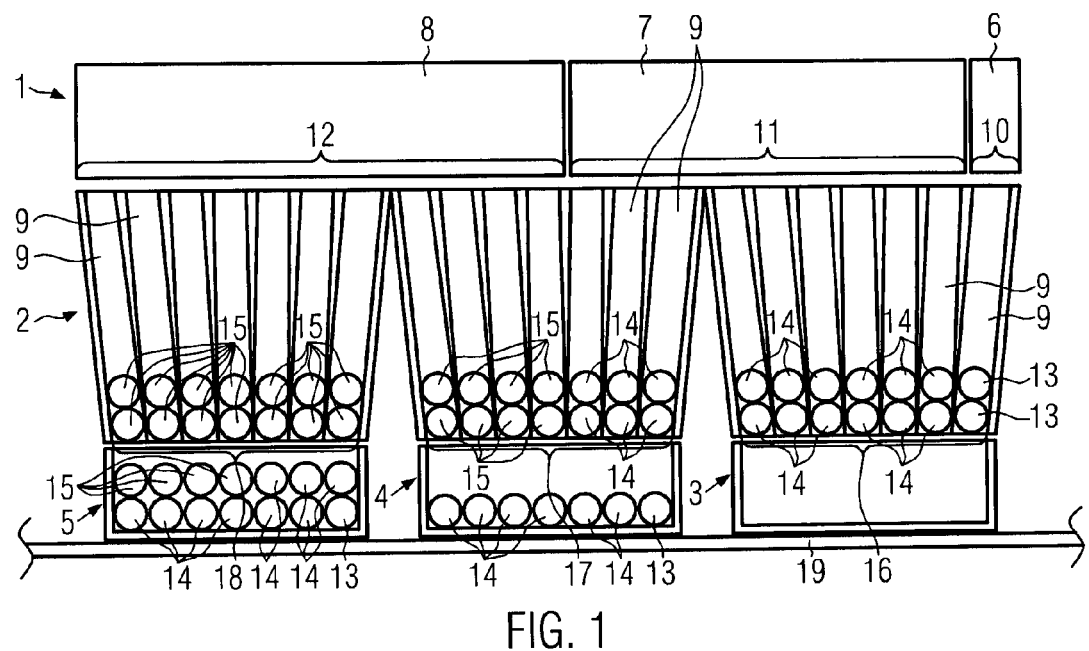
FIG. 1 shows an embodiment of an apparatus according to the invention in a frontal cross section.

The apparatus according to the embodiment of the invention as shown in FIG. 1 comprises a feeder arrangement 1 arranged above a hopper 2 and several pockets 3, 4, 5.

The feeder arrangement 1 comprises a first feeder 6, a second feeder 7, and a third feeder 8. Each of the feeders 6, 7, 8 provides rod shaped articles to the hopper 2. The hopper 2 comprises a plurality of hopper vanes 9, wherein a first subset 10 of hopper vanes 9 is assigned to the first feeder 6, a second subset 11 of hopper vanes 9 is assigned to the second feeder 7, and a third subset 12 of hopper vanes 9 is assigned to the third feeder 8. In particular, the first feeder 6 is arranged above the first subset 10 of hopper vanes 9, the second feeder 7 is arranged above the second subset 11 of hopper vanes 9, and the third feeder 8 is arranged above the third subset 12 of hopper vanes 9. Each of the feeders 6, 7, 8, respectively provides different types of rod shaped articles 13, 14, 15 to the different hopper vanes 9.

The hopper vanes 9 are arranged substantially in an equal distance at their upper edge, which is adjacent to the feeders 6, 7, 8 of the feeder arrangement 1. In the downstream direction, the feeder vanes 9 are inclined towards each other to provide separate transfer locations at their downstream ends. In particular, the hopper vanes 9 are grouped into a first transfer location 16, a second transfer location 17, and a third transfer location 18. Each of the transfer locations 16, 17, 18 of hopper vanes 9 provide one layer of rod shaped articles 13, 14, 15 into the pockets 3, 4, 5. The pockets 3, 4, 5 are arranged on a conveyor belt 19. After the pocket 3 has received the first layer of rod shaped articles, comprising a first type of rod shaped articles 13 and a second type of rod shaped articles 14, the pocket 3 moves with the conveyor belt 19 in the further downstream position as shown for pocket 4, such that it can receive rod shaped articles 14, 15 from the second transfer location 17 of hopper vanes 9. The second transfer location 17 of hopper vanes 9 provides rod shaped articles of the second type 14 and of a third type 15. After having received the second layer of rod shaped articles 14, 15 from the second transfer location 17 of hopper vanes 9, the pocket 4 moves into the further downstream position as shown for pocket 5 in FIG. 1 by means of the conveyor belt 19. Then, the third transfer location 18 provides a third layer of rod shaped articles to the pocket, wherein the hopper vanes 9 of the third transfer location 18 only comprise rod shaped articles of the third type 15.

Thus, finally, three layers of rod shaped articles 13, 14, 15 are provided in the pocket 3, 4, 5, wherein the first layer comprises one smoking article of the first type 13 in the right most position, and the remaining rod shaped articles of the first layer are rod shaped articles of the second type 14. The middle layer of the rod shaped articles in the pocket is comprised of rod shaped articles of the second type 14 and the third type 15, and the third layer of the rod shaped articles in the pocket is comprised of rod shaped articles of the third type 15 only. Thus, depending on the arrangement of the feeders 6, 7, 8 above the hopper vanes 9 defining the subsets 10, 11, 12, any combination of rod shaped articles can be provided in the pockets. The smoking article of the first type 13 forms a first part of the collation, the smoking articles of the second type 14 form a second part of the collation, and the smoking articles of the third type 15 form a third part of the collation.

Figure 2:
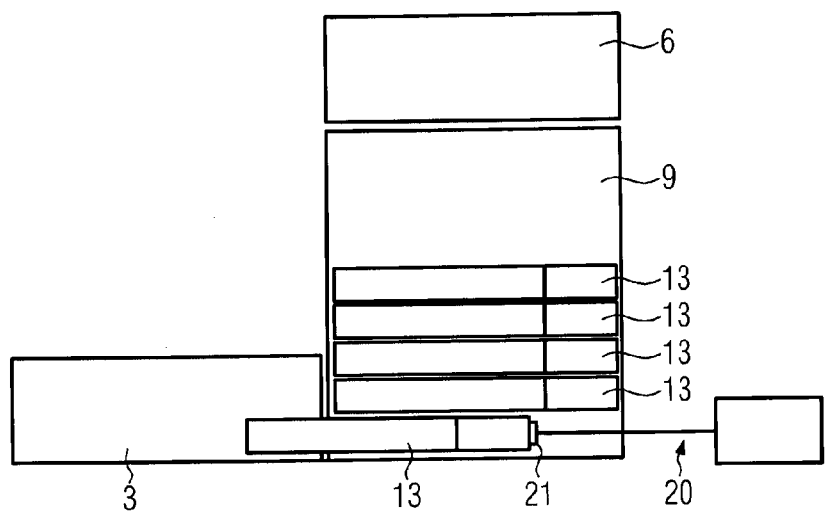
FIG. 2 shows the embodiment of an apparatus according to the invention in a side cross section.

In FIG. 2, a cross section of the rightmost feeder 6, hopper vane 9, and pocket 3 as seen in the side view is shown. The rod shaped articles of the first type 13 fall from the first feeder 6 into the rightmost hopper vane 9, wherein they are arranged on top of each other in a single column of rod shaped articles 13. The lowermost smoking article 13 is engaged by a pushing means 20, in particular in the form of a linear drive, which comprises a protruding pushing element 21 that can be moved linearly in the direction of the pocket 3 and transfers the smoking article 13 into the pocket 3 along the smoking article's longitudinal direction. In particular, the pushing means 20 may engage all rod shaped articles 13, 14 of the transfer location of hopper vanes, such that all rod shaped articles of one layer are transferred at the same time into the pocket 3. The same applies regarding the transfer of the rod shaped articles 14, 15 of the second and third layer into the pockets 4 and 5.

Figure 3:
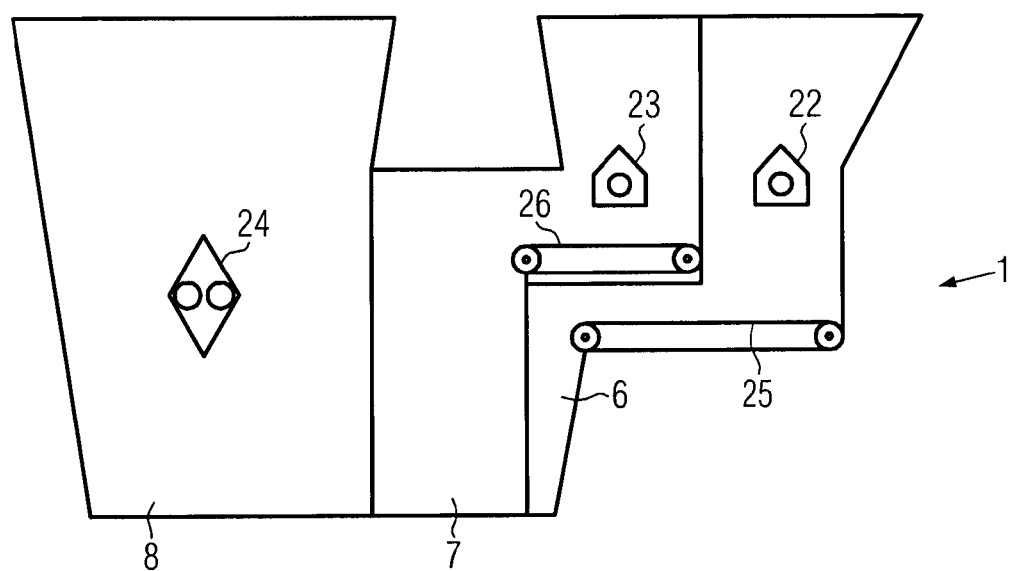
FIG. 3 shows a feeder arrangement for an apparatus according to the invention in a frontal cross section.

In FIG. 3, the feeder arrangement 1 of the present invention is shown in more detail. In each of the feeders 6, 7, 8, rod shaped articles of one type are arranged in parallel and adjacent to each other. To enable a smooth movement of the rod shaped articles, vibration means 22, 23, 24 are provided, which comprise at least a vibration generator or the like. Furthermore, conveyor belts 25, 26 may be provided in the feeders, in the present embodiment, in particular in feeder 6 and in feeder 7, to enable that the rod shaped articles 13, 14 are conveyed towards vertical sections, in which the rod shaped articles 13, 14 are transported for example by means of gravity or vibration towards the upstream end of the hopper 2.

Thus, the apparatus according to the invention allows providing different types of rod shaped articles to a pocket, wherein a collation of rod shaped articles is arranged for further transfer to a container of rod shaped articles.

In some embodiments, the different types of rod shaped articles may be the same that is the different feeders provide the same type of rod shaped articles. However, if the production of packages comprising different types of rod shaped articles is required, at least one of the feeders can be provided with different rod shaped articles, preferably the second feeder.

The sufficient level of rod shaped articles to be fed to the hopper vanes is ensured by level sensors that are arranged at the entrance of the hopper vanes, wherein these sensors are preferably adapted to trigger the provision of rod shaped articles by means of the feeder arrangement, in particular by means of the individual feeders. In particular, the conveyor belts 25, 26, or the vibration means 22, 23, 24, are only operated when rod shaped articles should be fed from the feeding means to the hopper vanes. Rotating fingers may be arranged in the feeders of the feeder arrangement to prevent a jam of the rod shaped articles and to facilitate the conveying of the rod shaped articles.

The invention claimed is:

1. Apparatus for forming a predetermined collation of rod shaped articles, in particular smoking articles, comprising
   a feeder arrangement,
   a pocket, the pocket being adapted to house a predetermined number of rod shaped articles in the predetermined collation, wherein in the predetermined collation each rod shaped article has a predetermined position within the pocket,
   a hopper with a plurality of hopper vanes, wherein each hopper vane is at least associated to one predetermined position in the pocket,
   wherein the feeder arrangement comprises:
      a first feeder being adapted to provide a first subgroup of rod shaped articles of a first type to a first subset of hopper vanes, the first subgroup of the rod shaped articles being a first part of the predetermined collation,
      a second feeder being adapted to provide a second subgroup of rod shaped articles of a second type to a second subset of hopper vanes, the second subgroup of the rod shaped articles being a second part of the predetermined collation,
      a third feeder being adapted to provide a third subgroup of rod shaped articles of a third type to a third subset of hopper vanes, the third subgroup of the rod shaped articles being a third part of the predetermined collation,
   wherein the second feeder is arranged in between the first feeder and the third feeder, and
   wherein at least the first type of rod shaped articles is different from the second type of rod shaped articles and wherein at least the second type of rod shaped articles is different from the third type of rod shaped articles.

2. Apparatus according to claim 1, wherein the first type of rod shaped articles is the same as the third type of rod shaped articles.

3. Apparatus according to claim 1, wherein the predetermined collation comprises a predetermined number of collation layers and collation columns.

4. Apparatus according to 3, wherein each hopper vane is associated to one collation column or one collation layer.

5. Apparatus according to claim 1, wherein the number of hopper vanes in the hopper corresponds to the number of rod shaped articles in the predetermined collation such that each hopper vane is associated to a predetermined position for a rod shaped article in the predetermined collation.

6. Apparatus according to claim 1, wherein separate transfer locations of hopper vanes provide the different layers of rod shaped articles in the collation, and wherein the subsets of hopper vanes and the transfer locations of hopper vanes are different, such that different types of rod shaped articles are comprised in a layer of rod shaped articles in the pocket.

7. Apparatus according to claim 6, wherein the pocket is movable between the predetermined number of transfer locations.

8. Apparatus according to claim 6, wherein the pockets are provided on an endless conveyor and are adapted to stop consecutively at each of the predetermined number of transfer locations, the apparatus being adapted to transfer one layer of rod shaped articles from each transfer location into each pocket.

9. Apparatus according to claim 1, wherein a vibration generator is provided to enable a smooth transport of the rod shaped articles.

10. Apparatus according to claim 2, wherein the predetermined collation comprises a predetermined number of collation layers and collation columns.

11. Apparatus according to 10, wherein each hopper vane is associated to one collation column or one collation layer.

12. Apparatus according to claim 7, wherein the pockets are provided on an endless conveyor and are adapted to stop consecutively at each of the predetermined number of transfer locations, the apparatus being adapted to transfer one layer of rod shaped articles from each transfer location into each pocket.

13. Apparatus according to claim 12, wherein a vibration generator is provided to enable a smooth transport of the rod shaped articles.

14. Container comprising rod shaped articles, which have been formed to a predetermined collation by the apparatus according to claim 1, such that the container comprises at least two different types of rod shaped articles, wherein the container comprises columns and rows with different types of rod shaped articles.

15. Method for forming a collation of rod shaped articles, in particular smoking articles, in a pocket, wherein in the predetermined collation each rod shaped article has a predetermined position in the pocket, comprising the steps of:
   providing a plurality of hopper vanes, wherein each hopper vane is at least associated to one predetermined position in the pocket,
   providing a first subgroup of rod shaped articles of a first type to a first subset of hopper vanes,
   providing a second subgroup of rod shaped articles of a second type to a second subset of hopper vanes,
   providing a third subgroup of rod shaped articles of a third type to a third subset of hopper vanes, wherein the second subset of hopper vanes is arranged in between the first subset of hopper vanes and the third subset of hopper vanes, and
   transferring the rod shaped articles from the first subset of hopper vanes, the second subset of hopper vanes and the third subset of hopper vanes into the pocket, such that each position in the predetermined collation is occupied by a rod shaped article of a predetermined type, wherein at least the first type of rod shaped articles is different from the second type of rod shaped articles and wherein at least the second type of rod shaped articles is different from the third type of rod shaped articles.

16. Method according to claim 15, wherein the step of transferring the rod shaped articles comprises moving the pocket between transfer locations, wherein each transfer location is associated with a layer or column of rod shaped articles in the predetermined collation.

17. Method according to claim 15, wherein the step of transferring the rod shaped articles comprises transferring rod shaped article of a first type into the pocket from the first and third subset of hopper vanes and transferring rod shaped article of a second type into the pocket from the second subset of hopper vanes, such that the rod shaped articles of a second type are arranged within at least one layer of the predetermined collation, such that rod shaped articles of the first type are arranged on both sides of the rod shaped articles from a second type within the layer.

18. Method according to claim 15, comprising the further step of providing the rod shaped articles comprised in the pocket to a container while maintaining their relative positions with respect to each other.

19. Container comprising rod shaped articles, which have been formed to a predetermined collation by the method of claim 15, such that the container comprises at least two different types of rod shaped articles, wherein the container comprises columns and rows with different types of rod shaped articles.

* * * * *